United States Patent [19]

Hager et al.

[11] Patent Number: 5,747,607
[45] Date of Patent: May 5, 1998

[54] SHEET MOLDING COMPOSITION HAVING CONTROLLABLE THICKENING

[75] Inventors: William G. Hager, Westerville; Edward L. Wilson, Newark; Paul R. Krumlauf, Thornville, all of Ohio

[73] Assignee: Owens-Corning Fiberglas Technology, Inc., Summit, Ill.

[21] Appl. No.: 673,778

[22] Filed: Jun. 27, 1996

Related U.S. Application Data

[63] Continuation-in-part of Ser. No. 364,355, Dec. 27, 1994, abandoned.

[51] Int. Cl.⁶ ............................................. C08F 20/00
[52] U.S. Cl. ............... 525/445; 528/272; 528/296; 528/300; 528/302; 528/303; 528/306; 528/307; 528/308; 525/43; 525/44; 525/168; 525/437; 523/514; 526/323; 526/328.5
[58] Field of Search ........................ 528/272, 296, 528/300, 302, 303, 306, 307, 308; 525/43, 44, 168, 437, 445; 523/514; 526/323, 328.5

[56] References Cited

U.S. PATENT DOCUMENTS

| | | | |
|---|---|---|---|
| 2,443,737 | 6/1948 | Kropa | 525/44 |
| 4,016,142 | 4/1977 | Alexander et al. | 525/437 |
| 4,330,643 | 5/1982 | Ogasawara et al. | 525/445 |
| 4,374,215 | 2/1983 | Atkins | 523/514 |
| 4,567,240 | 1/1986 | Hergenrother et al. | 525/328.1 |
| 5,118,783 | 6/1992 | Raju | 528/274 |
| 5,151,493 | 9/1992 | Smith et al. | 528/272 |
| 5,373,058 | 12/1994 | Hager et al. | 525/168 |
| 5,489,481 | 2/1996 | Hager et al. | 428/431 |
| 5,541,254 | 7/1996 | Hager et al. | 515/44 |

FOREIGN PATENT DOCUMENTS

| | | |
|---|---|---|
| 695459 | 10/1964 | Canada. |
| 0350730 | 1/1990 | European Pat. Off.. |
| 0475661 | 3/1992 | European Pat. Off.. |
| 57-61044 | 4/1982 | Japan. |
| 58-107304 | 6/1983 | Japan. |
| 1353476 | 5/1974 | United Kingdom. |

*Primary Examiner*—Samuel A. Acquah
*Attorney, Agent, or Firm*—C. Michael Gegenheimer; Inger H. Eckert

[57] ABSTRACT

A sheet molding composition is provided which exhibits controllable thickening. The composition includes a low molecular weight polyester in which some of the chain ends have been endcapped with functional groups which are unable to react with the thickeners employed in the sheet molding composition. The sheet molding composition has a low viscosity of from about 6 to about 20 million centipoise which allows molding at low pressures of from about 100 to about 300 psi.

16 Claims, No Drawings

SHEET MOLDING COMPOSITION HAVING CONTROLLABLE THICKENING

CROSS REFERENCE TO RELATED APPLICATION

This application is a continuation-in-part of U.S. application Ser. No. 08/364,355, filed Dec. 27, 1994 now abandoned.

TECHNICAL FIELD

The present invention relates to a sheet molding composition which exhibits controllable thickening, and more particularly, to a sheet molding composition having a relatively low viscosity which allows sheet molding of the composition at low pressures.

BACKGROUND

Molded component parts such as body panels in automotive applications are commonly formed using sheet molding compound (SMC) formulations. Sheet molding compositions typically include unsaturated polyester resins, thickening agents, and a monomer such as styrene which copolymerizes with the unsaturated polyester during curing in the molding process. Sheet molding compositions also typically contain thermoplastic polymers referred to as "low-profile additives", which are added to prevent undesirable shrinkage which may occur during the molding process.

Sheet molding compositions, initially of low viscosity to provide good wetting of glass fibers, are typically brought to significantly higher viscosity for ease of handling and to ensure proper flow of the composition into heated molds for curing during the molding process. Specifically, polyester resins are low viscosity, sticky liquids. Thus, sheet molding compositions made with polyester resins must be thickened prior to molding. The thickening or maturation process typically encompasses mixing the polyester resin with thickening agents such as alkali metal oxides and hydroxides which react or complex with the polyester resin. This increases the initial viscosity from about 20,000 to about 30,000 centipoise from about 25 to about 60 million centipoise (Brookfield HBP viscometer at 20° C.). However, the viscosity increase from the addition of thickening agents is so great that high pressures of about 800 to about 1,000 psi (56.25 to 70.31 kg/cm²) must be used during the molding process to ensure homogeneous dispersion of the components and to ensure that the mold is completely filled out, especially when molding large parts such as automotive hoods. This is disadvantageous as high pressure molding requires the use of expensive, large presses and expensive steel tools.

It would be desirable to be able to regulate the thickening of the sheet molding composition to obtain a somewhat lower viscosity which would allow molding at lower pressures, using smaller and less expensive presses and tools, and without sacrificing surface appearance of the molded parts.

Accordingly, a need still exists in the art for a sheet molding composition for use in molding component parts which exhibits controllable thickening and which allows molding at low pressures.

DISCLOSURE OF INVENTION

The present invention meets this need by providing a sheet molding composition which exhibits controllable thickening. This is accomplished by the inclusion of a low molecular weight unsaturated polyester resin which has been endcapped to limit the ability of the resin to complex with conventional thickeners used in the sheet molding composition. This results in unexpected controllable thickening of the sheet molding composition and good flow during molding which allows molding of parts at lower molding pressures, while still maintaining the surface appearance of parts molded at much higher pressures.

According to one aspect of the present invention, a sheet molding composition is provided which exhibits controllable thickening and good handling at much lower viscosity than conventional systems. The composition includes a thickening agent and an unsaturated polyester resin formed from an unsaturated polyester having a weight average molecular weight of from about 500 to about 5,000 g/mole which has been endcapped to block at least some of the chain ends of the polyester from reacting with the thickening agent such that the viscosity of the sheet molding composition is from about 6 to about 20 million centipoise (unless indicated otherwise, all viscosity values given here are measured with Brookfield HBP viscometer at about 20° C.) after thickening. By "block", it is meant that some, but not all, of the chain ends of the polyester are endcapped with groups which are unable to complex with the thickening agents used in the sheet molding composition, thus providing controlled thickening. However, it should be appreciated that the endcapped polyester resin is still reactive during curing, i.e., the endcapped portions and/or the remaining groups on the polyester resin will react when curing takes place in the molding process.

The unsaturated polyester preferably comprises the polycondensation product of one or more glycols and one or more acids or acid anhydrides. In a preferred embodiment, the polyester comprises the polycondensation product of propylene glycol and maleic anhydride. Preferably, the unsaturated polyester has a weight average molecular weight of from about 1,000 to about 4,000 g/mole.

The polyester is preferably endcapped with an endcapper that is a monofunctional molecule selected from the group consisting of alcohols, acids, epoxies, and isocyanates. In one embodiment, the endcapper preferably comprises glycidyl methacrylate. Other preferred endcappers include propoxylated allyl alcohol and benzoic acid.

The thickening agent in the sheet molding composition is preferably selected from the group consisting of metal oxides and hydroxides.

Preferably, the sheet molding composition further includes an ethylenically unsaturated monomer selected from the group consisting of styrene, methyl-styrene, methyl-acrylate, ethyl-acrylate, methyl-methacrylate, and ethyl methacrylate.

The composition may further include one or more thermoplastic low profile additives, catalysts, mold release agents, and fillers.

The method of forming the sheet molding composition preferably comprises the steps of providing an unsaturated polyester having a weight average molecular weight of from about 500 to about 5,000 g/mole which has been endcapped, and then combining the polyester with a thickening agent such that the viscosity of the sheet molding composition after thickening is from about 6 to about 20 million centipoise (Brookfield HBP viscometer at 20° C.).

The method preferably also includes the step of combining the polyester resin with an ethylenically unsaturated monomer selected from the group consisting of styrene, methyl-styrene, methyl-acrylate, ethyl-acrylate, methyl-methacrylate, and ethyl methacrylate.

The method preferably further includes the step of molding the sheet molding composition at a pressure of from about 100 to 300 psi (7.03 to 21.1 kg/cm$^2$). Parts molded using the sheet molding composition of the present invention have Loria values of less than about 70, and preferably less than about 50, which indicates a smooth surface.

Accordingly, it is a feature of the present invention to provide a sheet molding composition including an unsaturated polyester resin which controls the thickening of the composition to allow molding at low pressures. This, and other features and advantages of the present invention will become apparent from the following detailed description and the appended claims.

PREFERRED MODES FOR CARRYING OUT THE INVENTION

The sheet molding composition of the present invention provides many advantages over prior art compositions. By utilizing a polyester resin having a low molecular weight and then capping some, but not all, of the chain ends of the polyester, the viscosity of the resulting sheet molding composition may be controlled so that it will not thicken to the extent that typical SMC formulations do, yet it will maintain good handling characteristics. The high viscosity of typical SMC formulations (e.g., 20 to 60 million centipoise) requires the use of high pressures during molding to enable the SMC to properly flow into and fill the molds. Such prior art processes must use pressures of between 800 to 1,000 psi (56.25 to 70.31 kg/cm$^2$) to ensure homogeneous dispersion of the components and to prevent partially filled molds.

By using the low molecular weight, endcapped, unsaturated polyester resin in the sheet molding composition of the present invention to control thickening for low viscosity and to achieve good handling properties, the use of smaller presses and inexpensive molds may be employed because such high molding pressures are no longer required. Sheet molding compounds made with the polyester resin composition of the present invention may be molded at pressures of 100 to 300 psi (7.03 to 21.1 kg/cm$^2$), and the resulting parts exhibit excellent surface characteristics comparable to parts molded at higher pressures.

The unsaturated polyester resin of the present invention is preferably prepared by polyester condensation of one or more glycols and one or more acids or acid anhydrides in a molar ratio of about 1:1. Suitable glycols include propylene glycol, dipropylene glycol, diethylene glycol, 1,3-butanediol, neopentyl glycol (NPG), 1,4-cyclohexanedimethanol (CHDM), 2,2,4-trimethyl-1,3-pentanediol (TMPD), 2-methyl-1,3-propanediol, ethylene glycol, and glycerol. Preferred acids and acid anhydrides are unsaturated polycarboxylic acids including maleic anhydride, maleic acid, and fumaric acid. A minor proportion of the unsaturated acid, up to about 40 mole %, may be replaced by a saturated dicarboxylic or polycarboxylic acid that does not contain a polymerizable carbon-carbon double bond. Suitable dicarboxylic or polycarboxylic acids include phthalic, isophthalic, terephthalic, succinic, adipic, sebacic, and methyl-succinic acids.

The condensation reaction is preferably stopped at an acid value of from about 50 to about 80 mg KOH/g resin, which is much higher than conventional methods which stop the reaction at an acid value of about 10 to 30 mg KOH/g resin. Alternatively, the reaction may be stopped at an acid value of from about 30 to about 50 mg KOH/g resin and at a viscosity (measured by cone and plate viscometer) of from about 3.9 to about 4.5 poise. Thus, the degree of polymerization is limited such that the number of repeating units per polymer chain is only about 3 to 32 (molecular weight of about 500 to 5,000 g/mole), and more preferably 19–20, which results in a low molecular weight of about 3,000 g/mole. Conversely, a typical polyester resin used in sheet molding compositions is comprised of 100 or more repeating units per chain, resulting in a high molecular weight of about 15,000 to 20,000 g/mole.

Examples of suitable unsaturated polyester resins for use in the present invention include the polycondensation products of propylene glycol and maleic and/or fumaric acids; 1,3-butanediol and maleic and/or fumaric acids; 2-methyl-1,3-propanediol and maleic and/or fumaric acids; combinations of 2-methyl-1,3-propanediol, propylene glycol and maleic and/or fumaric acids; combinations of ethylene and propylene glycols (approximately 50 mole percent or less of ethylene glycol) and maleic and/or fumaric acids; and propylene glycol, maleic and/or fumaric acids, and dicyclopentadiene reacted with water.

The resulting polyester resins contain reactive unsaturated groups distributed throughout the chain from the maleic and/or fumaric acids. These polyester resins are preferably then reacted with an endcapper that is a monofunctional molecule including glycidyl ethers, alcohols, epoxies, isocyanates, or acids such that some, but not all, of the chain ends on the polyester are replaced with functional groups. For example, when endcapping poly(maleic anhydride co-propylene glycol) with glycidyl methacrylate, enough endcapper is used to react only about 30 to about 60 mole %, preferably about 35 to about 45 mole %, and most preferably about 40 mole % of the available acid groups at the polyester chain ends. These ranges of percentages are also generally applicable to any endcapping procedure. Thus, only some of the chain ends become incapable of complexing with the thickening agents in the sheet molding composition. By controlling the percentage of chain ends which are capped, the viscosity of the composition may be controlled. This partial endcapping provides controlled thickening as the sheet molding composition is still thickened to a sufficient level for processing. If all of the acid groups on the polyester were reacted, thickening would not take place.

The endcappers are preferably selected from alcohols, acids, epoxies and isocyanates. Suitable alcohols include benzyl alcohol, α-phenylmethyl alcohol, β-phenylmethyl alcohol, diphenylcarbinol, triphenylcarbinol, cynnamyl alcohol, hexanol, n-octyl alcohol, n-decyl alcohol, hydroxyethyl methacrylate, and propoxylated allyl alcohol.

Suitable acids for use as endcappers include valeric acid, caproic acid, lauric acid, myristic acid, palmitic acid, stearic acid, oleic acid, linoleic acid, cyclohexanecarboxylic acid, phenylacetic acid, octanoic acid, and benzoic acid.

Suitable epoxies include butyl glycidyl ether, cresyl glycidyl ether, phenyl glycidyl ether, octyl glycidyl ether, nonyl glycidyl ether, decyl glycidyl ether, undecyl glycidyl ether, dodecyl glycidyl ether, tridecyl glycidyl ether, tetradecyl glycidyl ether, nonylphenyl glycidyl ether, p-tert-butylphenyl glycidyl ether, and 2-ethylhexyl glycidylether (2-EHGE).

In a preferred embodiment, the endcapper is selcted from glycidyl acrylates represented by the formula

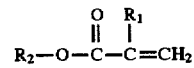

where $R_1$ is hydrogen or an alkyl radical having 1 to 5 carbon atoms, and $R_2$ is a glycidyl ester group having the formula

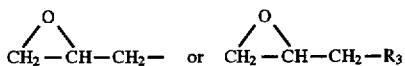

where $R_3$ ranges from $C_7H_{14}O_3$— to $C_{11}H_{20}O_3$—. Generally, $R_3$ is comprised of reaction products employing 1,4-butanediol, neopentyl glycol, resorcinol, cyclohexanedimethanol, and the like.

Generally, the glycidyl acrylates have the composition represented by the formulas above, where $R_1$ is hydrogen or an alkyl radical having 1 to 5 carbon atoms; $R_2$ is $C_3H_5O$— to $C_{14}H_{25}O_4$—; and $R_3$ is $C_7H_{14}O_3$— to $C_{11}H_{20}O_3$—. Preferred glycidyl acrylates have the composition where $R_1$ is hydrogen or an alkyl radical having 1 to 3 carbon atoms; $R_2$ is $C_3H_5O$— to $C_{10}H_{19}O_4$—; and $R_3$ is $C_7H_{14}O_3$— to $C_8H_{16}O_3$—.

Isocyanates which may be used as endcappers include methyl isocyanate, phenyl isocyanate, isobutyl isocyanate, tert-butyl isocyanate, β-naphthyl isocyanate, 2,6-dichlorophenyl isocyanate, and 2,6-diisopropyl isocyanate.

Preferred endcappers for use in the present invention include glycidyl methacrylate (GMA), propoxylated allyl alcohol, and benzoic acid. However, it should be appreciated that any endcapper may be used in the present invention which is capable of endcapping a portion of the chain ends of the polyester resin. Typically, the endcappers prevent complexing of the polyester chain end with alkali metal oxides and hydroxides by replacing a carboxylic acid or hydroxyl group with a noncomplexing group.

The endcappers may be reactive or unreactive endcappers. By "reactive", it is meant that the endcappers are capable of further reacting with the unsaturated functional groups of the polyester and with the monomer component when the unsaturated polyester is cured during the molding process. Thus, while all of the endcappers are able to partially block the polyester resin from complexing with thickening agents, only some are able to react during curing. For example, the benzoic acid is an unreactive endcapper, so it effectively blocks some of the polyester chain ends from complexing with alkaline earth metal oxides and hydroxides during the thickening process, but does not further react with the polyester or monomer during crosslinking. Conversely, glycidyl methacrylate and propoxylated allyl alcohol are reactive endcappers which react with unsaturated functional groups of the polyester and with the monomer component.

If desired, small amounts of reaction inhibitors such as toluhydroquinone (THQ), butylated hydroxytoluene, para-benzoquinone (PBQ), tert-butylhydroquinone (TBQ), and butylated hydroxyanisole may also be added to the unsaturated polyester resin in the polycondensation reaction during formation of the resin and/or during endcapping to delay curing of the resin.

After the polyester resin is partially endcapped, it is preferably added to an ethylenically unsaturated monomer which is copolymerizable with the unsaturated polyester during curing which takes place during the molding process. A preferred monomer is styrene. Other suitable monomers include methyl-styrene, methyl-acrylate, ethyl-acrylate, methyl-methacrylate, and ethyl methacrylate.

The resulting partially endcapped polyester resin may then be mixed with the thickening agents and other components to form the sheet molding composition. Such components may include glass fibers, thermoplastic low profile additives, catalysts, fillers, and mold release agents.

The chemical thickening agents used in the sheet molding composition include metal oxides and hydroxides. Suitable thickeners include magnesium oxide, magnesium hydroxide, calcium oxide and calcium hydroxide. The thickener is preferably present in the composition in an amount ranging from about 0.5 to about 6 parts by weight. The thickener is preferably suspended in a carrier resin which does not react with the thickener, such as, for example, polymethylmethacrylate, polyvinyl acetate, and saturated or unsaturated polyesters. The carrier resin is present in an amount ranging from about 0.5 to about 8 parts by weight, based on 100 parts by weight of the polyester resin.

Thermoplastic low profile additives used in the sheet molding composition typically function to reduce resin contraction (shrinkage) during polymerization. Suitable polymers for use as low-profile additives include homopolymers and copolymers of acrylic and methacrylic acid esters, cellulose acetate butyrate, vinyl acetate homopolymers and copolymers, polyurethanes prepared from polyisocyanates and diisocyanates with polyester or polyether polyols, saturated polyesters, polycaprolactone, styrene-butadiene copolymers, modified cellulose, and alkyl oxide polymers.

Catalysts may be used in the sheet molding composition to aid in curing or crosslinking of the unsaturated polyester. Suitable catalysts include organic peroxides and peracids such as tert-butylperbenzoate, tert-butylperoctoate, and benzoyl peroxide. The amount of catalyst may be varied depending on the molding process used. In the present invention, the catalyst is preferably present in an amount of from about 0.5 to about 2.5 parts by weight based on 100 parts by weight of the total composition.

The sheet molding composition may further include fibers, fillers and pigments. Reinforcing fibers typically include glass fibers, glass fabrics, chopped glass strands, and chopped or continuous strand glass fiber mats. Other reinforcing agents which may be used include asbestos, cotton, synthetic organic fibers and metals.

Fillers may also be present including clay, talc, calcium carbonate, silica, and calcium silicate. The fillers are preferably present in an amount of from about 165 to 250 parts by weight based on 100 parts by weight of the total resin and reactive monomer composition. Suitable pigments include organic and inorganic pigments, such as carbon black, iron oxide and titanium dioxide. The pigments may be present in an amount of from about 0 to 8 parts by weight.

The sheet molding composition may further include mold release agents, such as calcium stearate and zinc stearate, which aid in removal of the molded parts from the dies.

The sheet molding composition is preferably formed by blending together the partially endcapped unsaturated polyester and monomer, with any low-profile additives, catalysts, mold release agents, and fillers. The thickening agent and carrier resin are then added in a second step along with any pigments to form a paste.

This paste is then typically metered onto a film. A layer of glass fibers or other reinforcement is then added in such a way as to form a paste-reinforcement-paste sandwich. This continuous sandwich is then rolled onto a mandrel or other support and stored at elevated temperature to mature and thicken the resin composition. When thickening is complete, the composition is placed in a mold which generally comprises a matched set of steel dies, and is compressed and cured under heat and pressure. Due to the relatively low viscosity of the resin composition (e.g., from about 6 to about 20 million centipoise) the parts may be molded at low pressures of around 100 to 300 psi (7.03 to 21.1 kg/cm$^2$). Suitable molding cycles are typically conducted at from about 120° C. to about 175° C. for periods of time ranging from about 20 seconds to about 5 minutes.

Parts molded using the sheeting molding composition of the present invention have excellent surface characteristics. Such parts generally have a Loria value which is less than 50, and have been as low as 36.

In order that the invention may be more readily understood, reference is made to the following examples, which are intended to be illustrative of the invention, but are not intended to be limiting in scope.

EXAMPLE 1

An unsaturated polyester resin was formed in accordance with the present invention. In a 10 gallon stainless steel reactor fitted for polyester synthesis, 16.12 kg propylene glycol, 18.90 kg maleic anhydride, and 14.0 g of a 10% solution of toluhydroquinone (THQ) were added. The reactor was heated to about 205° C. until the acid value reached 45–60 mg KOH/g resin and the viscosity at 125° C. measured 5–6 poise using a cone-and-plate viscometer.

The reactor was then cooled to 120° C. While maintaining the melt at 120° C., the following components were added to the reactor: 8.67 g butylated hydroxytoluene, 0.75 g parabenzoquinone, 34.7 g N,N-dimethylbenzylamine and 1600.0 g glycidyl methacrylate as an endcapper. The glycidyl methacrylate was pumped into the reactor at a rate of about 40 g per minute so as not to exceed 120° C. After the addition was complete, the reactor temperature was maintained at 120° C. for 0.5 to 1.0 hours.

The resin mixture was then thinned by adding it to the following mixture: 17.8 kg styrene, 2.12 g 3-tert-butylhydroquinone, 0.8 g PBQ, and 1.25 g butylated hydroxyanisole.

EXAMPLE 2

A sheet molding composition was prepared in accordance with the present invention using the endcapped unsaturated polyester prepared from Example 1. The sheet molding composition had the following formulation:

| Component | Weight (g) |
| --- | --- |
| unsaturated polyester | 2,709 |
| low profile additive[1] | 1,144 |
| styrene | 984 |
| anti-separation additive/compatibilizer[2] | 218 |
| poly(butadiene-co-acrylonitrile) rubber[3] | 52 |
| tert-butyl-peroxybenzoate | 77 |
| calcium stearate | 206 |
| calcium carbonate thickener[4] | 11,107 |
| titanium dioxide | 206 |
| carrier[5] | 288 |
| low profile additive[6] | 140 |
| vinyl toluene | 45 |
| zinc stearate | 23 |
| calcium oxide | 46 |
| magnesium hydroxide thickener[7] | 185 |

[1]E-540 (poly(ethylene glycol-co-propylene glycol-co-adipic acid) in styrene) from Alpha Owens Corning
[2]CBA-60 (6%) from Witco
[3]Hycar 1300X31 from B. F. Goodrich
[4]Calwhite II from Georgia Marble
[5]LP-90 (low molecular weight polyvinyl acetate) from Union Carbide
[6]P-710 (polypropylene oxide) from Alpha Owens Corning
[7]Marinco H from Calgon The sheet molding composition was allowed to maturate and thicken for several days prior to molding. The viscosity of the composition at the time of molding was between about 6 to 20 million centipoise, as measured at 20° C. using a Brookfield HBP viscometer. The sheet molding composition was molded at between about 400 to 500 psi (28.14 to 35.16 kg/cm$^2$) using a 12"×18" (30.5 cm×45.72 cm) mold.

The surface analysis of the resulting molded part yielded a Loria value of 36.

EXAMPLE 3

An unsaturated polyester resin was formed in accordance with the present invention. In a 10-gallon stainless steel reactor fitted for polyester synthesis, 18.51 kg of maleic anhydride, 15.79 kg of propylene glycol, and 14.00 g of a 10% solution of toluhydroquinone (THQ) were added. The reactor was heated to about 205° C. until the acid value reached 40–45 mg KOH/g resin and the viscosity measured 3.9–4.5 poise using a cone-and-plate viscometer.

The reactor was then cooled to 135° C. While maintaining the melt at 135° C., the following components were added to the reactor: 1.50 g of a 10% solution of toluhydroquinone, 10.00 g of dibutyl tin oxide, and 2.0 kg of propoxylated allyl alcohol as an endcapper. The reactor was then heated to about 200° C. until the acid value reached 18–22 mg KOH/g resin and the viscosity measured 6–7 poise using a cone-and-plate viscometer. The polyester was then let down into an 80° C. solution of 15.0 kg styrene, 0.71 g p-benzoquinone, and 3.55 g hydroquinone.

EXAMPLE 4

A sheet molding composition was prepared in accordance with the present invention using the endcapped unsaturated polyester prepared from propylene glycol and maleic anhydride and endcapped with glycidyl methacrylate (5% by weight in final product). The sheet molding composition had 65.3% solids, a viscosity (Brookfield No. 4 at 100 rpm) of 510 centipoise, and an acid value of 30. The composition had the following formulation:

| Component | Parts per Hundred Weight (phr) |
| --- | --- |
| endcapped polyester | 54.41 |
| low profile additive[1] | 22.90 |
| styrene | 19.75 |
| anti-separation additive/compatibilizer[2] | 2.94 |
| parabenzoquinone | 300 ppm |
| 1,1-(di-tert-butylperoxy)-3,3,5-trimethylcyclohexane[3] | 1.3 |
| calcium stearate | 4.0 |
| calcium carbonate[4] | 220.0 |
| calcium oxide | 0.5 |
| carrier/thickener/pigment | 11.75 |

[1]E-540 (poly(ethylene glycol-co-propylene glycol-co-adipic acid) in styrene) from Alpha Owens Corning
[2]CBA-60 (6%) from Witco
[3]29B75, a peroxide catalyst
[4]Calwhite II from Georgia Marble The sheet molding composition was allowed to maturate and thicken for 31 days prior to molding. The viscosity of the composition at the time of molding was about 20 million centipoise, as measured at 20° C. using a Brookfield HBP viscometer. The sheet molding composition was molded. The surface analysis of the resulting molded part yielded a Loria value of 65.

EXAMPLE 5

A sheet molding composition was prepared in accordance with the present invention using the endcapped unsaturated polyester prepared from propylene glycol and maleic anhydride and endcapped with glycidyl methacrylate (5% by weight in final product). The sheet molding composition had 64.5% solids, a viscosity (Brookfield No. 3 at 60 rpm) of 578 centipoise, and an acid value of 14.2. The composition had the following formulation:

| Component | Parts per Hundred Weight (phr) |
| --- | --- |
| endcapped polyester | 52.66 |
| low profile additive[1] | 22.16 |
| styrene | 19.11 |
| anti-separation additive/ compatibilizer[2] | 4.23 |
| poly(butadiene-co-acrylonitrile) rubber[3] | 1.00 |
| tert-butyl perbenzoate | 1.5 |
| calcium stearate | 4.0 |
| calcium carbonate[4] | 220.0 |
| carrier/thickener/pigment | 15.28 |

[1]E-540 (poly(ethylene glycol-co-propylene glycol-co-adipic acid) in styrene) from Alpha Owens Coming
[2]CBA-60 (6%) from Witco
[3]Hycar 1300X31 from B. F. Goodrich
[4]Calwhite II from Georgia Marble The sheet molding composition was allowed to mature and thicken for 25 days prior to molding. The viscosity of the composition at the time of molding was about 6 million centipoise, as measured at 20° C. using a Brookfield HBP viscometer. The sheet molding composition was molded. The surface analysis of the resulting molded part yielded a Loria value of 45–50.

While certain representative embodiments and details have been shown for purposes of illustrating the invention, it will be apparent to those skilled in the art that various changes in the embodiments, methods and apparatus disclosed herein may be made without departing from the scope of the invention, which is defined in the appended claims.

What is claimed is:

1. A sheet molding composition exhibiting controllable thickening including a thickening agent and an unsaturated polyester resin having an acid value of from about 50 to about 80 mg KOH/g resin, said resin formed from an unsaturated polyester having a weight average molecular weight of from about 500 to about 5,000 g/mole which has been endcapped with a monofunctional endcapper to block at least some of the chain ends of said polyester resin from reacting with said thickening agent; wherein the viscosity of said sheet molding composition after thickening is from about 6 to about 20 million cps.

2. The composition of claim 1 in which said unsaturated polyester comprises a polycondensation product of one or more glycols and one or more acids or acid anhydrides.

3. The composition of claim 1 in which said unsaturated polyester comprises a polycondensation product of propylene glycol and maleic anhydride.

4. The composition of claim 1 in which said polyester has been endcapped with an endcapper selected from the group consisting of alcohols, acids, epoxies, and isocyanates.

5. The composition of claim 3 in which said endcapper comprises glycidyl methacrylate.

6. The composition of claim 3 in which said endcapper comprises a propoxylated allyl alcohol.

7. The composition of claim 3 in which said endcapper comprises benzoic acid.

8. The composition of claim 1 in which said unsaturated polyester has a weight average molecular weight of from about 1,000 to about 4,000 g/mole.

9. The composition of claim 1 in which said thickening agent is selected from the group consisting of metal oxides and hydroxides.

10. The composition of claim 1 further comprising an ethylenically unsaturated monomer selected from the group consisting of styrene, methyl-styrene, methyl-acrylate, ethyl-acrylate, methyl-methacrylate, and ethyl methacrylate.

11. The composition of claim 1 further including one or more thermoplastic low profile additives.

12. A method of forming a sheet molding composition exhibiting controllable thickening comprising the steps of:

providing an unsaturated polyester having a weight average molecular weight of from about 500 to about 5,000 g/mole which has been endcapped such that some of the chain ends of said polyester are blocked from reacting with a thickening agent, said unsaturated polyester having an acid value of from about 50 to about 80 mg KOH/g resin; and combining said endcapped polyester resin with a thickening agent; wherein the viscosity of said sheet molding composition after thickening is from about 6 to about 20 million cps.

13. The method of claim 12 further comprising the step of combining said polyester resin with an ethylenically unsaturated monomer selected from the group consisting of styrene, methyl-styrene, methyl-acrylate, ethyl-acrylate, methyl-methacrylate, and ethyl methacrylate.

14. The method of claim 13 in which said thickening agent is selected from the group consisting of metal oxides and hydroxides.

15. The method of claim 13 further comprising the step of molding said sheet molding composition at a pressure of from about 100 to about 300 psi.

16. A sheet molding composition exhibiting controllable thickening comprising a thickening agent and an unsaturated polyester resin formed from an unsaturated polyester having a weight average molecular weight of from about 500 to about 5,000 g/mole which has been endcapped with a propoxylated allyl alcohol such that at least some of the chain ends of said polyester resin are blocked from reacting with said thickening agent; wherein the viscosity of said sheet molding composition after thickening is from about 6 to about 20 million centipoise.

* * * * *

UNITED STATES PATENT AND TRADEMARK OFFICE
CERTIFICATE OF CORRECTION

PATENT NO. : 5,747,607
DATED : May 5, 1998
INVENTOR(S) : Hager et al.

It is certified that error appears in the above-identified patent and that said Letters Patent is hereby corrected as shown below:

In Claim 12, Line 20, delete --forming-- and insert --preparing--.

Signed and Sealed this

Twenty-seventh Day of October, 1998

Attest:

BRUCE LEHMAN

*Attesting Officer*            *Commissioner of Patents and Trademarks*